United States Patent [19]

Harry et al.

[11] Patent Number: 5,509,965
[45] Date of Patent: Apr. 23, 1996

[54] PREFORM COATING APPARATUS AND METHOD

[75] Inventors: Ieuan L. Harry; Louis M. Silva, both of Nashua; Donald Zelonis, Manchester, all of N.H.

[73] Assignee: Continental PET Technologies, Inc., Del.

[21] Appl. No.: 48,145

[22] Filed: Apr. 15, 1993

Related U.S. Application Data

[63] Continuation-in-part of Ser. No. 853,419, Mar. 18, 1992, abandoned.

[51] Int. Cl.⁶ .................................................. B05C 3/10
[52] U.S. Cl. ........................ 118/423; 118/426; 118/503
[58] Field of Search ................................ 118/423, 675, 118/695, 696, 712, 679, 704, 707, 421, 426, 503; 53/122, 131.1, 411, 431, 443, 448, 475

[56] References Cited

U.S. PATENT DOCUMENTS

| | | | |
|---|---|---|---|
| 1,977,502 | 10/1934 | Van Wormer | 93/6 |
| 3,270,710 | 9/1966 | Johnson et al. | 118/423 X |
| 3,438,788 | 4/1969 | Gifford et al. | 99/171 |
| 3,496,910 | 2/1970 | Nugarus | 53/131 X |
| 3,524,295 | 8/1970 | Spaulding | 53/37 X |
| 3,589,926 | 6/1971 | Eckert et al. | 118/421 X |
| 3,867,902 | 2/1975 | Huffman | 118/423 |
| 3,986,636 | 10/1976 | Hoppmann et al. | 221/7 |
| 4,294,059 | 10/1981 | Stilwell et al. | 53/448 |
| 4,299,189 | 11/1981 | Hagberg et al. | 118/675 |
| 4,435,941 | 3/1984 | Booth et al. | 53/475 |
| 4,534,153 | 8/1985 | Nowicki | 53/448 |
| 4,573,429 | 3/1986 | Cobbs et al. | 118/322 |
| 4,632,053 | 12/1986 | Villanueua et al. | 118/66 |
| 4,654,227 | 3/1987 | Cornellier | 427/96 |
| 4,753,255 | 6/1988 | Melin | 134/52 |
| 4,821,673 | 4/1989 | Kirigakubo et al. | 118/319 |
| 5,061,528 | 10/1991 | Ruehl | 427/430.1 |
| 5,244,697 | 9/1993 | Vackier et al. | 427/430.1 |

FOREIGN PATENT DOCUMENTS

| | | |
|---|---|---|
| 2705911 | 8/1978 | Germany . |
| 380547 | 8/1973 | U.S.S.R. . |
| WO92/05026 | 4/1992 | WIPO . |

*Primary Examiner*—Robert J. Warden
*Assistant Examiner*—Harold Y. Pyon
*Attorney, Agent, or Firm*—Wolf, Greenfield & Sacks

[57] ABSTRACT

A preform transfer and coating apparatus and method is provided which utilizes a carrier plate to receive a newly-molded batch of preforms from the molding apparatus preform handling plate. A transfer apparatus automatically moves the carrier plate from a preform-receiving position to a preform-coating position where the preforms are dipped into a coating liquid, after which the coated preforms are moved transversely back towards a starting position where they are discharged into a gaylord or onto a conveyor which feeds a standard gaylord packaging system. There is also a sample-taking apparatus which removes preforms prior to coating.

26 Claims, 10 Drawing Sheets

PREFORM COATING APPARATUS AND METHOD

RELATED APPLICATION

This application is a continuation-in-part application of U.S. Ser. No. 07/853,419 filed on Mar. 18, 1992, now abandoned.

FIELD OF THE INVENTION

This invention relates to new and useful improvements in preform handling, and more particularly to an apparatus and method for immediately coating preforms after the injection molding of such preforms to prevent damage of the preforms by engagement with one another.

BACKGROUND OF THE INVENTION

In one method of blow molding plastic containers, such as polyethylene terephthalate (PET) carbonated beverage bottles, a preform is first formed by injection molding, followed by reheating and stretch blow molding of such preforms into containers. Generally, a preform is a tubular member having a closed bottom end, an open top end with a neck finish and supporting flange, and an elongated cylindrical body. The preforms are injection molded in large numbers in an injection molding machine, which includes a preform cooling or handling plate. At the time the preforms are removed from the injection mold, they are still relatively hot with the result that when one preform engages another preform, a groove is frequently formed in the exterior surface of such preform with the result that when such preform is blow molded, the resulting container has unacceptable surface contusions that are undesirable.

Further, the newly injection molded preforms are directed into large corrugated board boxes normally identified as "gaylords" for storage and shipment. The preforms normally slide down a chute directly from the preform handling plate into such gaylords, with the damage to the preforms occurring at this time.

SUMMARY OF THE INVENTION

It has been found that if the preforms are coated prior to touching one another, not only will the preforms be cooled further, but also the coating protects the preforms against damage when they touch one another within the gaylord. This invention in particular relates to an apparatus and method for coating such preforms automatically.

In accordance with this invention there is provided a preform coating and transfer apparatus which includes a rotatably and transversely moveable preform carrier plate. The carrier plate has an array of spaced-apart pins extending therefrom, one for each preform. The carrier plate moves into alignment with the molding apparatus preform handling plate and receives a plurality of newly-molded preforms therefrom. The transfer occurs while the carrier and handling plates are in spaced parallel and substantially vertical alignment, with the preforms disposed substantially perpendicular to the plates (i.e., with each cylindrical preform axis disposed in substantially horizontal alignment). This transfer is effected without damage to the preforms.

The carrier plate, having gripping members for engaging the supporting flange on each preform, then is rotated about 90° from a substantially vertical preform-receiving position to a substantially horizontal preform-coating position. The carrier plate and depending preforms (preform axis now vertically disposed) are then positioned to overlie a coating tank, and then the carrier plate and preforms are lowered into the coating tank to coat the preforms.

The carrier plate is next moved upwardly (out of the coating tank) and transversely to a preform-loading position overlying a collection device, which preferably includes a conveyor carrying a plurality of open-top containers known as gaylords. The carrier plate is then moved down into a gaylord until the preforms (preform axis vertically disposed and closed end down) are about to touch either the bottom of the gaylord or the previously deposited preforms. At this time, the preforms are released from the carrier plate and dropped gently into the gaylord.

The transfer apparatus is operative to release successive batches of preforms into the gaylord in a series of vertical steps (to minimize the drop distance) until the gaylord is filled. The filled gaylord is then automatically moved to a take-away position while a new empty gaylord is moved into the preform-loading position for receiving the next batch of coated preforms. The gaylords are moved longitudinally on a conveyor through a support frame overlying the coating tank and conveyor.

In an alternative embodiment, the coated preforms are released from the carrier plate onto a first conveyor and then transported to a standard gaylord packaging system. The first conveyor would be longitudinally moveable through the support frame.

While the primary purpose of the apparatus is to coat newly injection molded preforms, there is also an occasional desire to sample the preforms. Accordingly, there is provided a sample-taking plate which may be moved into a position adjacent the carrier plate and wherein the carrier plate, in lieu of placing the preforms in the coating tank, will place the preforms in the sample-taking plate for quality control testing or examination.

In accordance with the method of the invention, there is provided a longitudinally arranged collection device for receiving coated preforms, and a coating tank positioned transversely adjacent the collection device. A carrier plate is provided which is transversely movable above the collection device and coating tank and which supports a batch of preforms in a spaced-apart array. The method then includes the steps of: transferring a batch of newly-molded preforms from a molding apparatus preform handling plate to the carrier plate, while the carrier and handling plates are substantially vertically disposed; rotating the carrier plate to a substantially horizontal position; coating the preforms by insertion into the coating tank; transversely moving the carrier plate to overlie the collection device; and releasing the coated preforms onto the collection device. Preferably, the carrier plate is first lowered to a position adjacent the collection device to minimize the drop distance of the preforms onto the collection device. The coated preforms may be dropped directly into gaylords, or onto a conveyor which delivers them to a gaylord packaging system.

With the above and other objects that will hereinafter appear, the nature of the invention will be more clearly understood by reference to the following detailed description, the appended claims, and the several views illustrated in the accompanying drawings.

DETAILED DESCRIPTION

This invention most particularly relates to a transfer and coating apparatus for automatically receiving preforms after they have been discharged from an injection molding apparatus (not shown), coating the preforms and then transferring the preforms to gaylords. The transfer and coating apparatus is generally identified by the numeral 10.

Figure 1:
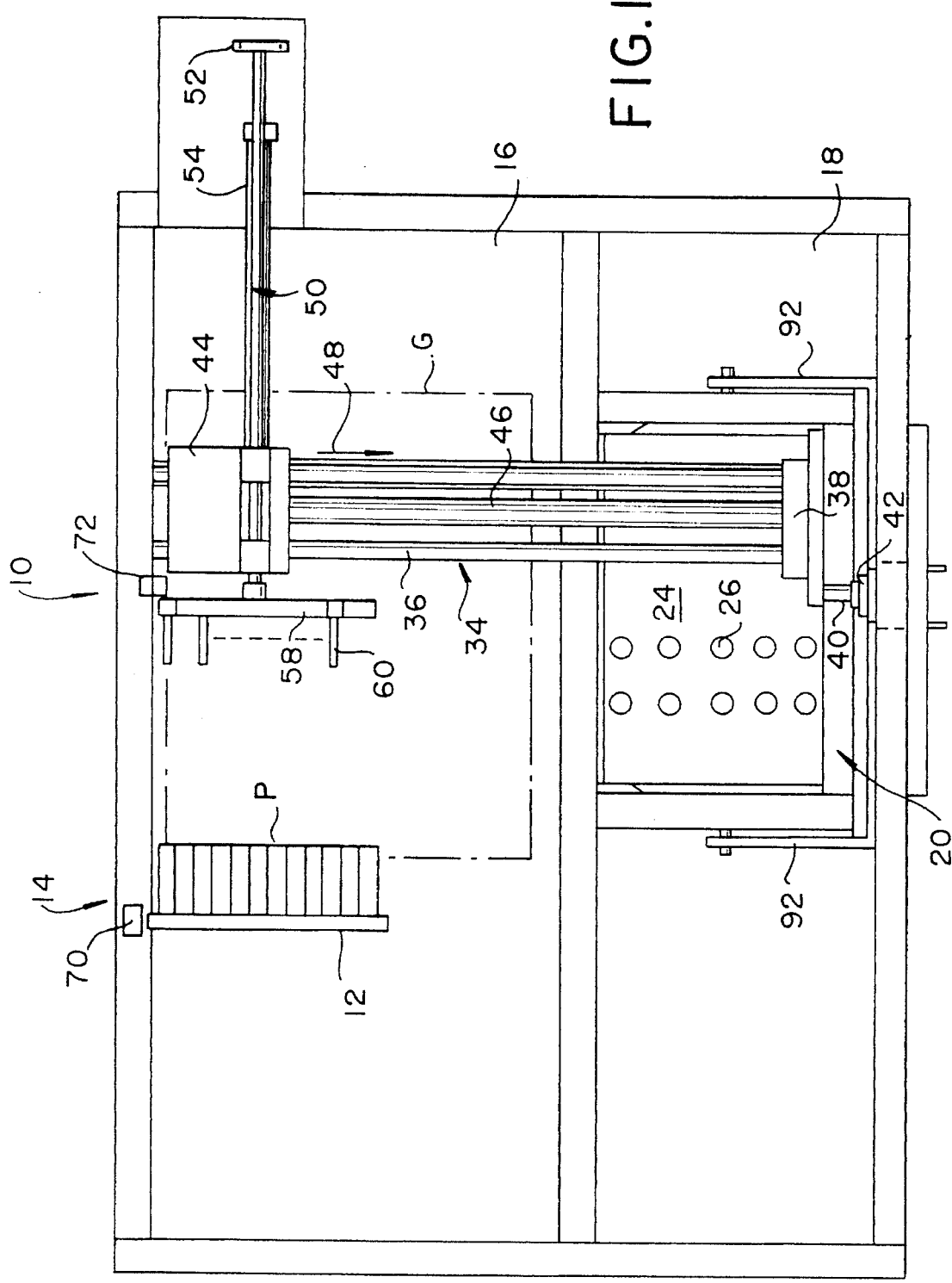
FIG. 1 is a top plan view of the combined coating and transfer apparatus and shows generally the relationship of the components thereof.

The injection molding apparatus includes a molding apparatus preform handling plate 12 which is conventional and which, after it receives the last injection molded preforms P is moved to the position illustrated in FIG. 1 from which the preforms P are received by the apparatus 10. The plate 12 is substantially vertically disposed and holds an array (e.g., 12×12) of spaced, parallel preforms at one end with their cylindrical axes horizontally disposed.

Figure 2:
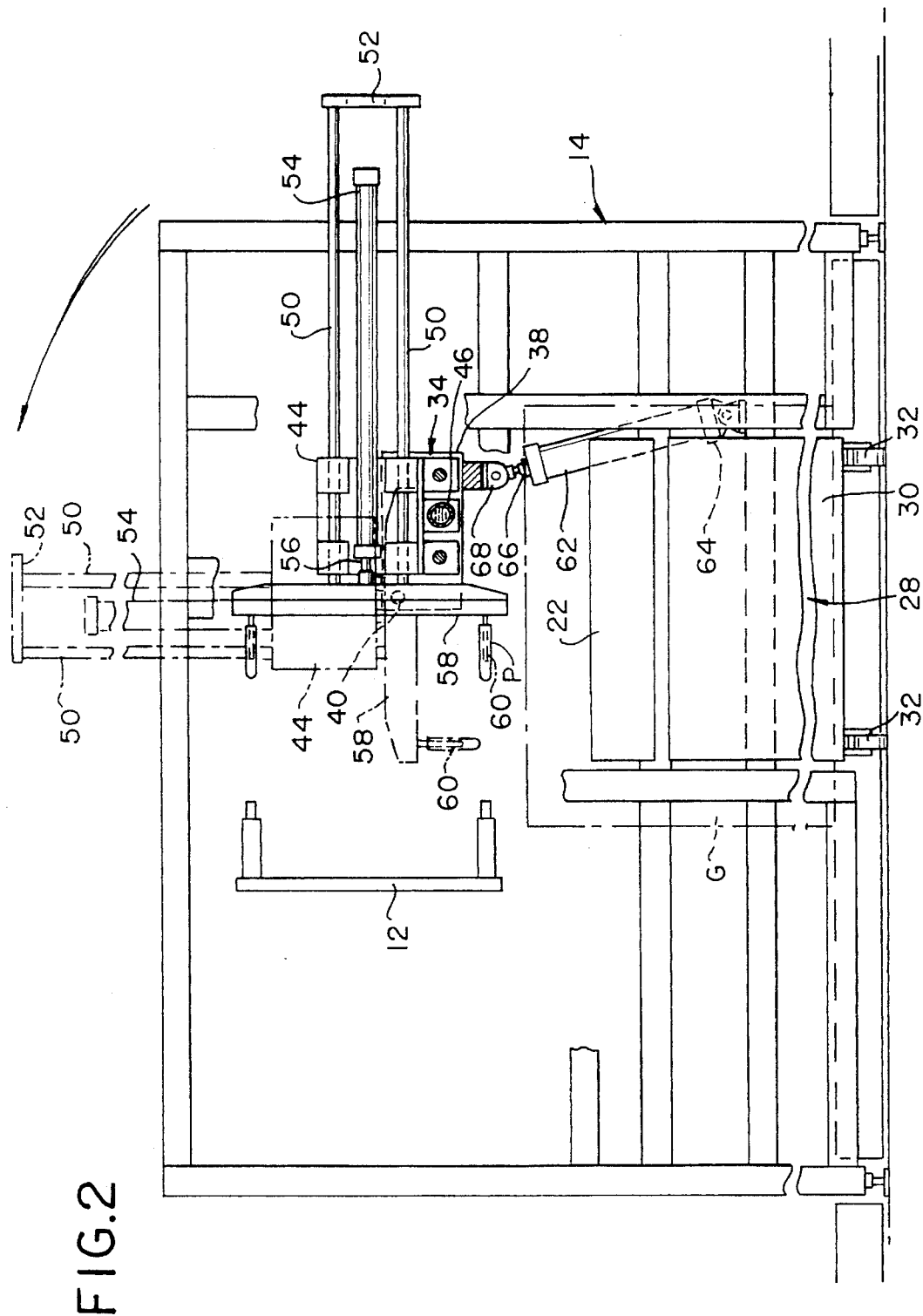
FIG. 2 is a side elevational view of the apparatus of FIG. 1 and shows how the preform carrier plate is rotated from a vertical preform receiving position to a horizontal coating and discharge position.
Figure 3:
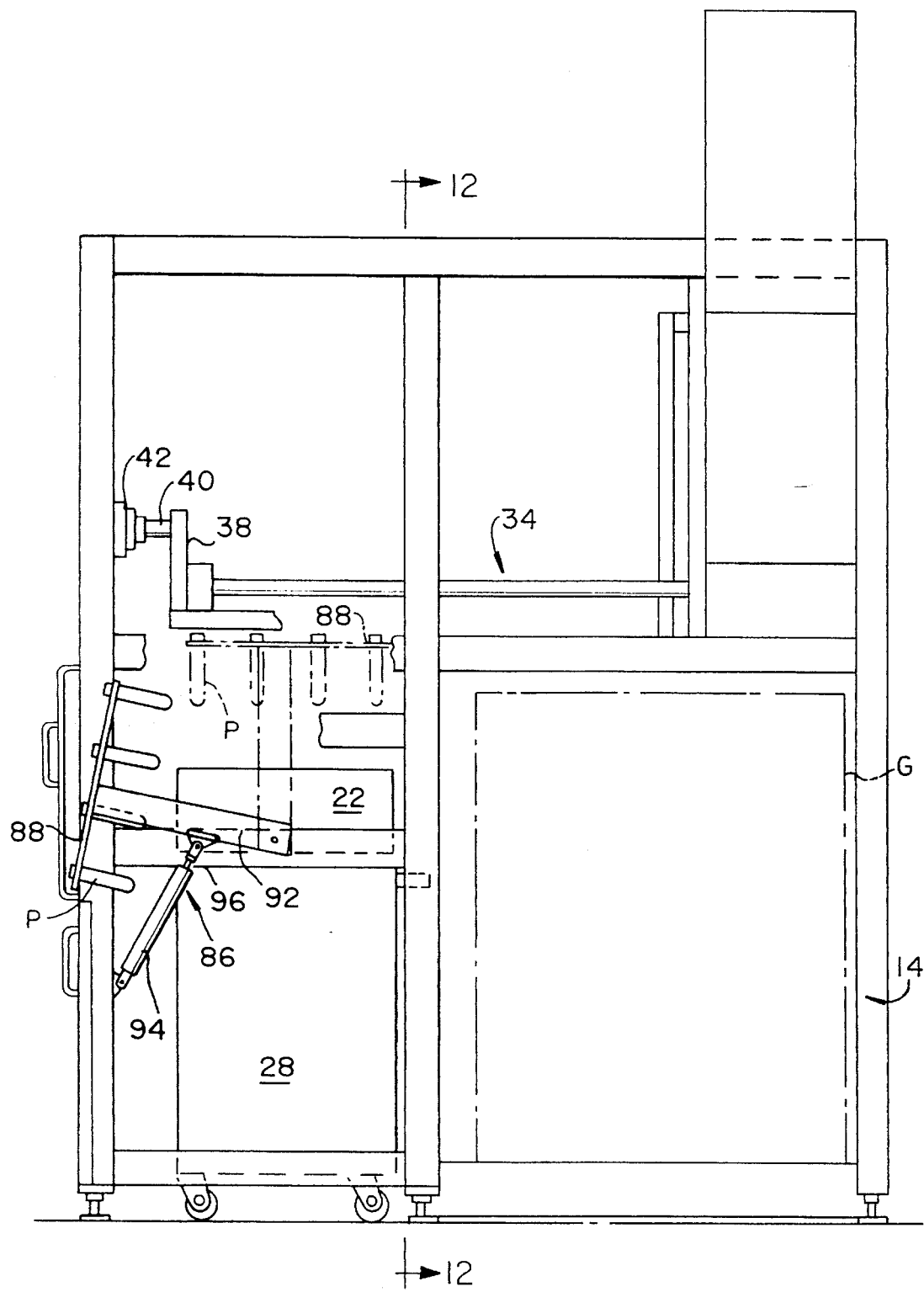
FIG. 3 is an end elevational view of the apparatus and shows how a sample plate may be pivoted between an out-of-the-way position to a sample-receiving position.

The transfer and coating apparatus 10 includes a structural framework generally identified by the numeral 14. The framework 14 as is clearly shown in FIG. 1 (top view), is generally divided into two transversely adjacent parts, a first part 16 through which gaylords G longitudinally pass, and a second part 18 in which there is mounted a coating apparatus generally identified by the numeral 20. As is best shown in FIGS. 2 and 3, the coating apparatus includes an upper coating tank 22 in which a predetermined supply of coating liquid (e.g., paraffin wax, fats and/or oils, silicone oil) is maintained at a preselected height and a predetermined temperature. The coating tank 22 includes a cover 24 which is provided with a plurality of preform receiving openings 26.

The coating apparatus also includes a coating liquid supply and cooling system generally identified by the numeral 28 which maintains the liquid level in the coating tank 22. It also maintains the temperature of the coating liquid. In order that the system 28 may be readily maintained, it is mounted generally in a housing 30 which is supported by wheels 32 which permit the system to be rolled out of the confines of the framework 14.

Figure 5:
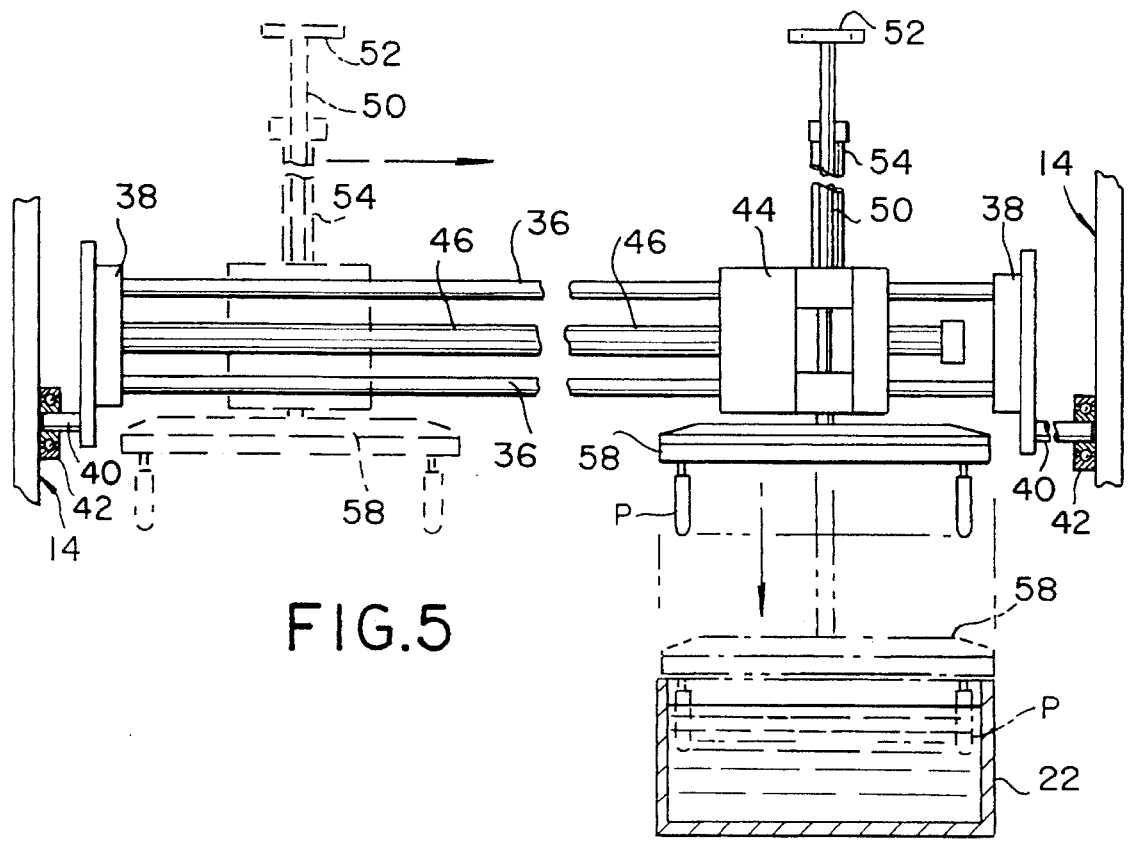
FIG. 5 is a schematic transverse elevational view showing how the preform carrier plate is shifted from a preform handling position transversely of the apparatus to a coating position.
Figure 6:
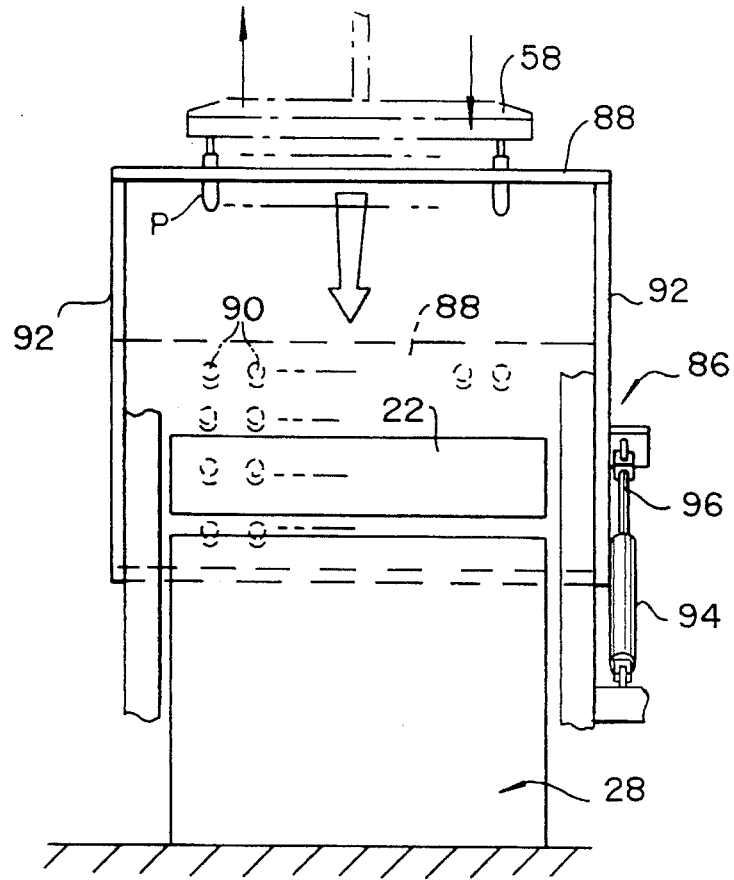
FIG. 6 is a fragmentary side elevational view showing specifically the mounting of the sample plate.

The apparatus 10 includes a transfer system which is generally identified by the numeral 34. The transfer system 34 includes a set of two horizontal rails 36 extending transversely across the support framework 14 and which are maintained in the desired spaced relation by way of plates 38 to which opposite ends of the rails 36 are fixedly secured (see FIG. 5). The plates 38 are carried by eccentrically positioned pivot pins 40 which, in turn, are journalled in bearing units 42 carried by the framework 14. This is clearly shown in FIGS. 1 and 5.

The transfer apparatus includes a head 44 which is slidably mounted on the rails 36 for transverse movement and positioning. The head 44 is connected to a magnetic piston (not shown) mounted for movement within an elongated fluid cylinder 46 also extending between the plates 38. The cylinder 46 is of the double-acting type with the piston moving transversly of the framework 14. There is a magnetic connection of a conventional type between the head 44 and the magnetic piston for movement of head 44 with the magnetic piston when the fluid cylinder 46 is actuated as indicated by the arrow 48.

The head 44 slideably carries a pair of longitudinally extending rails 50 which carry the preform carrier plate 58 at one end. The rails 50 are connected together remote from the plate 58 by way of an end plate 52, which has a clearance hole in it in order to pass by an extensible fluid cylinder 54. The head 44 supports the fluid cylinder 54.

The fluid cylinder 54 (aligned along rails 50) includes a piston rod 56 which is coupled to the carrier plate 58. The plate 58 carries a plurality of pins 60, one for each of the preforms P received from the injection molding apparatus preform handling plate 12. The pins form an array for holding the preforms in spaced-apart parallel alignment, with each preform cylindrical axis perpendicular to the plane of plate 58.

There is a further extensible fluid cylinder 62 which is pivotally connected at its lower end 64 to the framework 14. The fluid cylinder 62 includes a piston rod 66 which is pivotally connected at 68 to a cross link between the end plates 38.

As will be readily apparent from FIG. 2, when the fluid cylinder 62 is actuated to project the piston rod 66, the head 44 and the transfer apparatus 34 are pivoted about the pins or stub shafts 40 with the rails 50 being pivoted from the horizontal solid line position of FIG. 2 to the vertical broken line position of that same figure. This results in the carrier plate 58 being pivoted from its vertical preform-receiving position, to a horizontal preform-coating and loading position as is shown in FIG. 2 with the preform receiving pins 60 projecting downwardly therefrom.

BASIC OPERATION

With the preform carrier plate 58 in its vertical retracted position of FIG. 1, the injection molding preform handling plate 12 moves to the position shown in FIG. 1 carrying preforms P in alignment with the pins 60. When the injection molding preform handling plate 12 is in its proper position aligned with carrier plate 58, this position actuates a sensor and control device 70 (shown mounted on adjacent framework 14) for actuating the fluid cylinder 54 to move the carrier plate 58 from its original vertical retracted position of FIG. 1 to a vertical extended position adjacent the preform handling plate 12 so as to pick up the preforms P.

The fluid cylinder 54 is then automatically actuated by the control device to retract the carrier plate 58 to its original position of FIG. 1, at which time plate 58 engages a sensor and control device 72 (mounted on adjacent framework 14) to actuate the fluid cylinder 62 to rotate or pivot the carrier plate 58 from its vertical position of FIG. 2 to the horizontal dotted line position of FIG. 2.

Once this occurs, the fluid cylinder 46 is automatically actuated by the control device so as to move the head 44 transversely in the direction of the arrow 48 to move the carrier plate 58 to a position overlying the coating tank 22. At this time the preforms P carried by the plate 58 are aligned with the openings 26 in the cover 24 so that the preforms may be inserted into the coating liquid. This is automatically controlled by the actuation of the fluid cylinder 54 when the carrier plate 58 reaches its position overlying the coating system 20.

Figure 7:
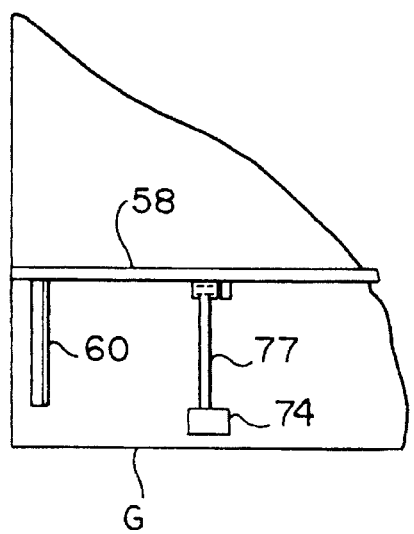
FIG. 7 is a fragmentary schematic sectional view showing the preform carrier plate positioned within a gaylord and the position of a sensor for detecting the bottom of a gaylord or preforms previously deposited in the gaylord to automatically stop the downward movement of the preform carrier plate.

The operation of the transfer apparatus is automatic and once the preforms are aligned with the coating apparatus 20, the preforms are automatically lowered by the carrier plate 58 to be coated, and then automatically lifted out of the tank. The carrier plate pauses to allow excess coating solution to drain off and then moves transversely back to the dotted line position of FIGS. 2 and 5. While transversing the preforms may pass through a series of air jets to remove excess coating solution at the preform tip. When the carrier plate 58 reaches the dotted line position of FIG. 2, it is automatically lowered into the gaylord G underlying the preforms. The carrier plate 58 is lowered into the gaylord G until a sensor and control device 74 (see FIG. 7) carried by the plate 58 senses either the bottom of the gaylord G or the preforms P previously loaded into the gaylord. At this time the preforms P are automatically released from the plate 58 and the plate 58 is moved upwardly back to the dotted line position of FIG. 2. When this occurs, the cylinder 62 is automatically actuated to return to its starting position and to rotate the carrier plate 58 from the horizontal position back to the vertical position thereof as is shown in FIG. 2. This position is sensed by the control device 72 and the apparatus 10 is ready for a repeat cycle, including the movement of the injection molding preform handling plate 12 back to the starting position shown in FIG. 1 with a new batch of preforms. As shown in FIG. 7, the sensor 74 may be carried by an arm 77 pivotally mounted on the under side of the plate 58 so as to be spaced below the pins 60 when the plate 58 is horizontal, and be rotated to lie closely adjacent the plate 58 (out of the way) when the plate 58 is vertical.

PREFORM RETENTION MECHANISM

Figure 9:
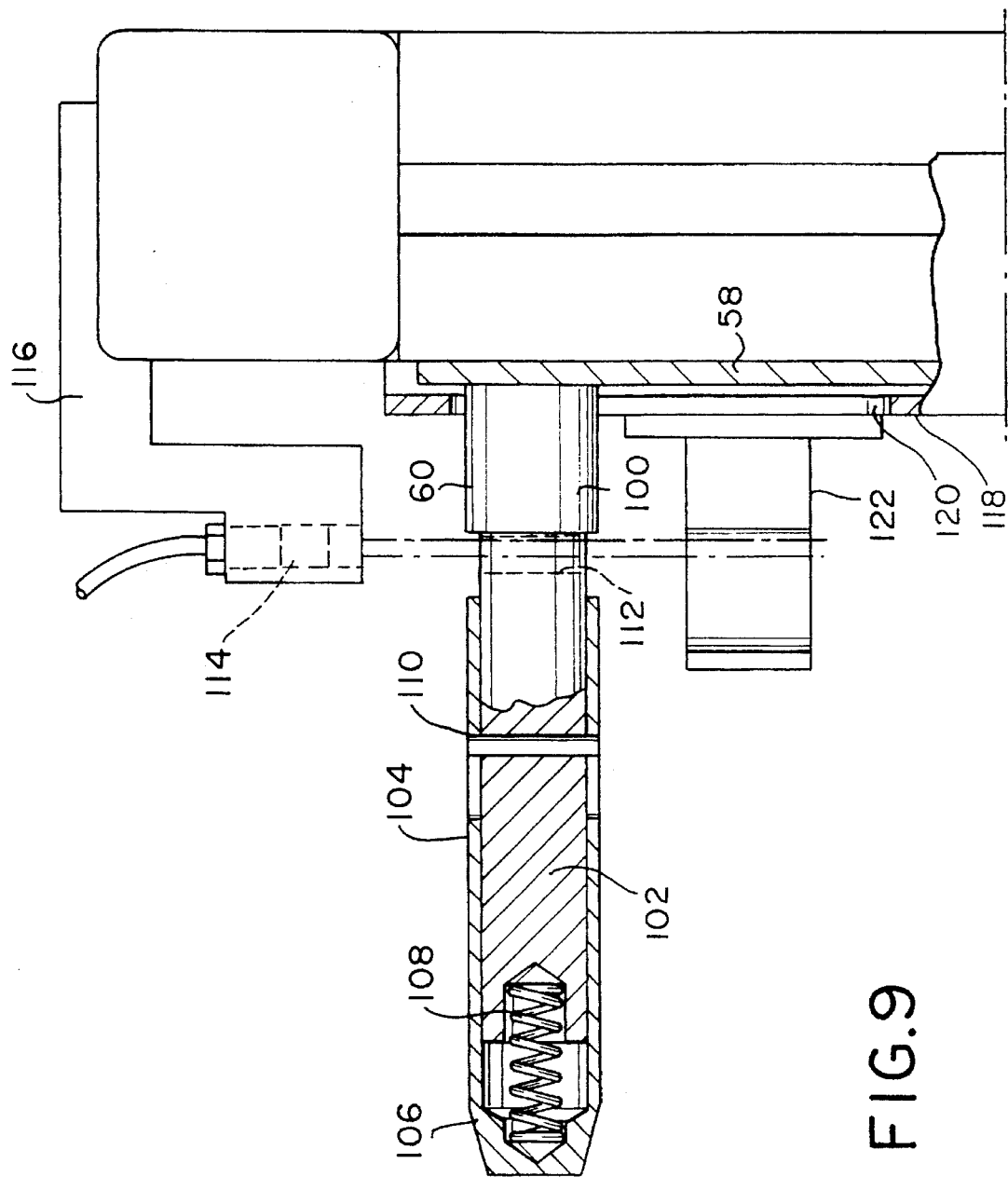
FIG. 9 is a fragmentary top view of the preform carrier plate showing the details of a preform receiving pin and one of a pair of gripper fingers for engaging a flange on the preform and retaining the preform on the pin.
Figure 10:
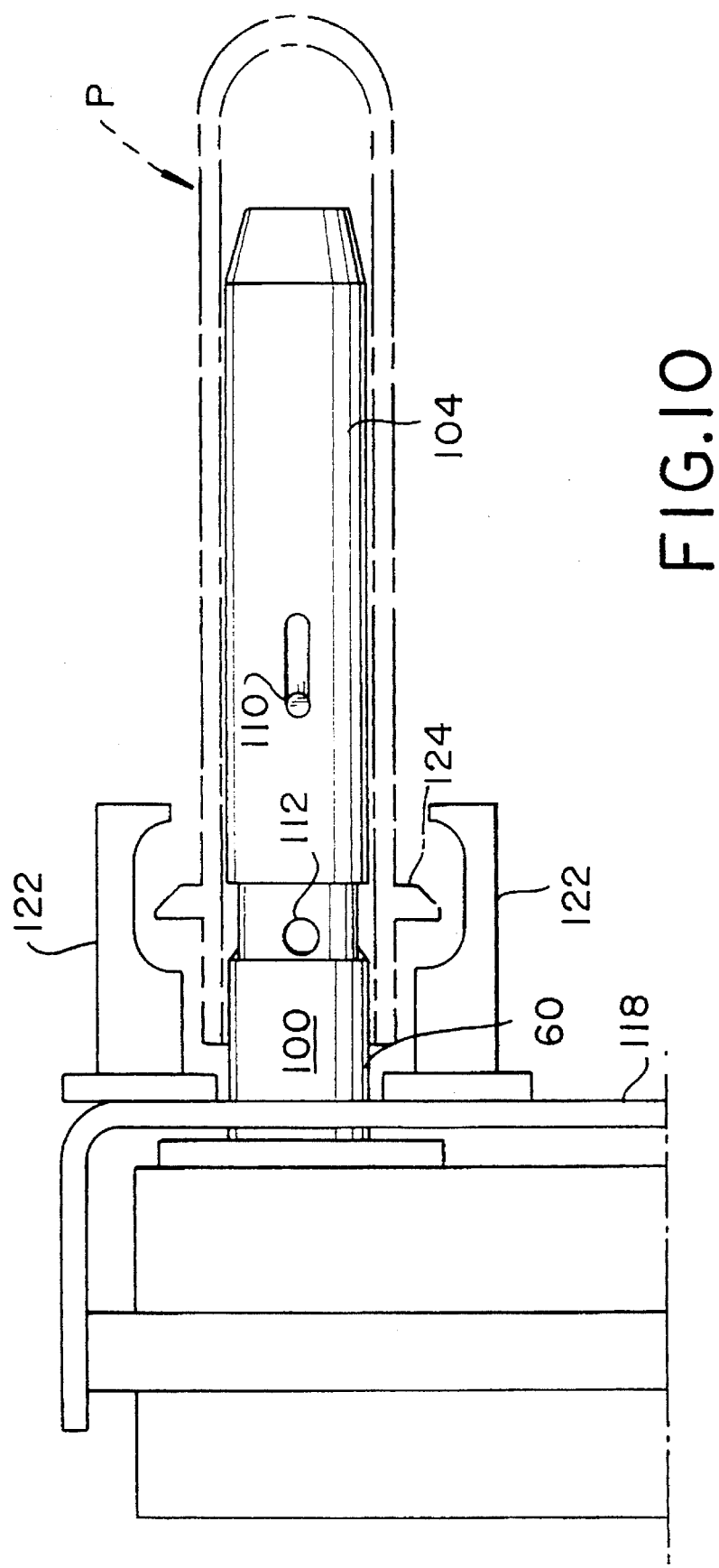
FIG. 10 is a fragmentary side view of the carrier plate with a preform mounted thereon (in phantom) showing further details of the pin including an optical sensor for sensing when a preform is improperly on a pin.
Figure 11:
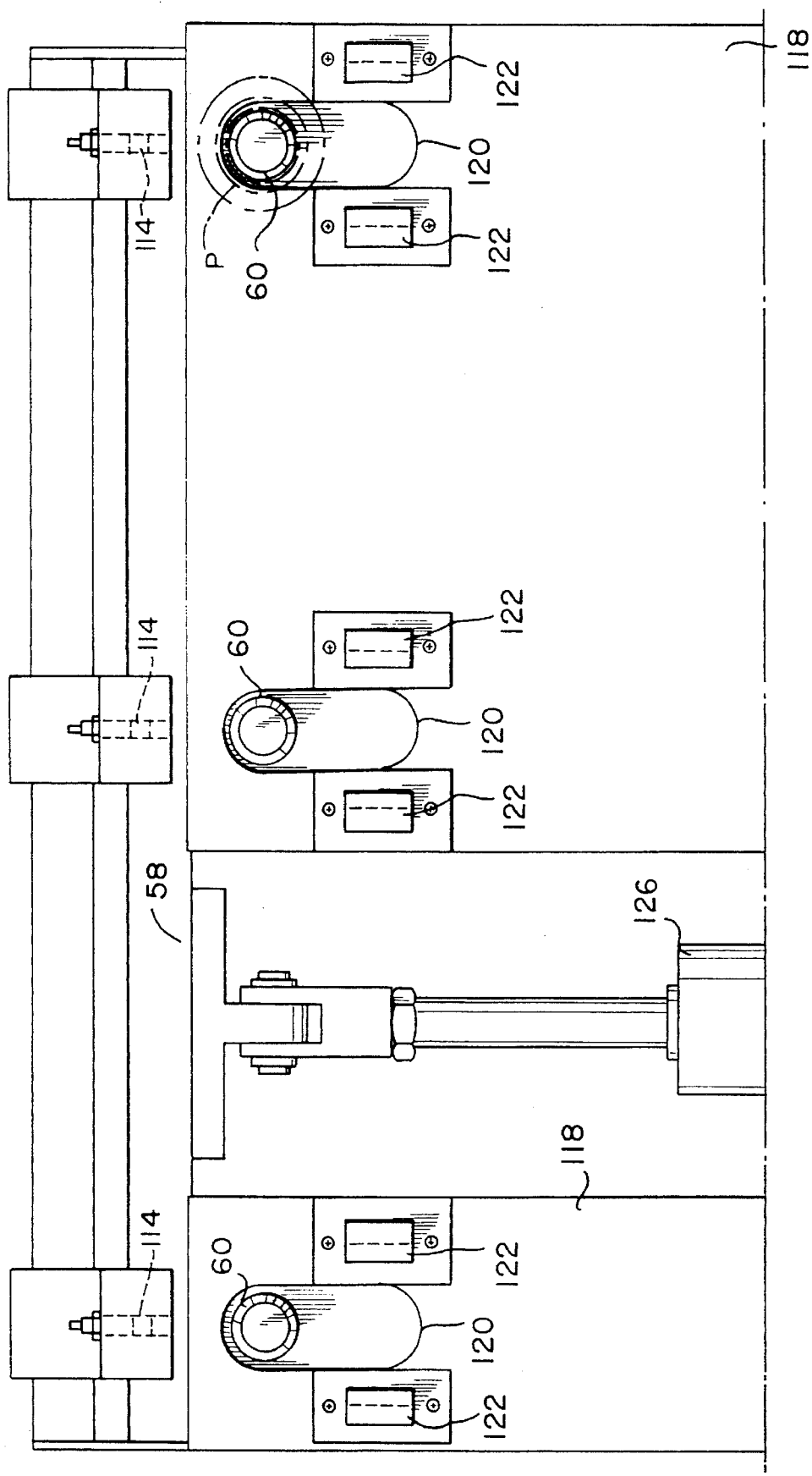
FIG. 11 is a fragmentary front elevational view of the preform carrier plate showing the mounting of the gripper fingers for movement to a preform locking position.

It is important that the preforms be aligned with the pins 60 and once a preform P is placed on a pin 60, it be retained on the pin when the pin is vertically disposed. The mechanism for accomplishing this is shown in FIGS. 9–11.

First of all, each pin 60 is formed with an enlarged head portion 100 which is fixedly secured to the plate 58. Each pin 60 also has a reduced diameter body 102 which has telescoped thereover a sleeve 104 which has a closed end 106 urged axially away from the head by a spring 108. The sleeve 104 is retained on the body 102 by a retaining pin 110.

The body 102 has a transverse bore 112 adjacent the head portion 100 which can be closed by the sleeve 104, when sleeve 104 is improperly engaged by a preform P being transferred to the pin 60. An optical sensor 114 is carried by a bracket 116 fixed relative to the plate 58. The sensor is in alignment with the transversely aligned bores 112 of all pins in a given row to detect movement of the sleeves 104. It is to be understood that when any of the bores 112 is closed, the carrier apparatus will not function. Normally, a rectangular array of pins is provided, e.g., 12×12, arranged in longitudinal and transverse rows.

A pair of plates 118 are slidably mounted on the carrier plate 58 and have longitudinal notches 120 receiving the top head portions 100 of the pins 60. The plates 118 carry a pair of transversely spaced gripper fingers 122 for each pin 60. As is best shown in FIG. 11, the gripper fingers 122, when shifted by the respective plate 118, serve to engage over a conventional supporting flange 124 on the preform P and restrict axial movement of preform P on the associated pin 60, thus preventing the preform from dropping off the pin when the pin is vertically disposed. In order to vary the positions of the plates 118 relative to the plate 58 to engage or release the gripper fingers, a fluid cylinder 126 extends between the plate 58 and the plates 118.

GAYLORD HANDLING APPARATUS

Figure 4:
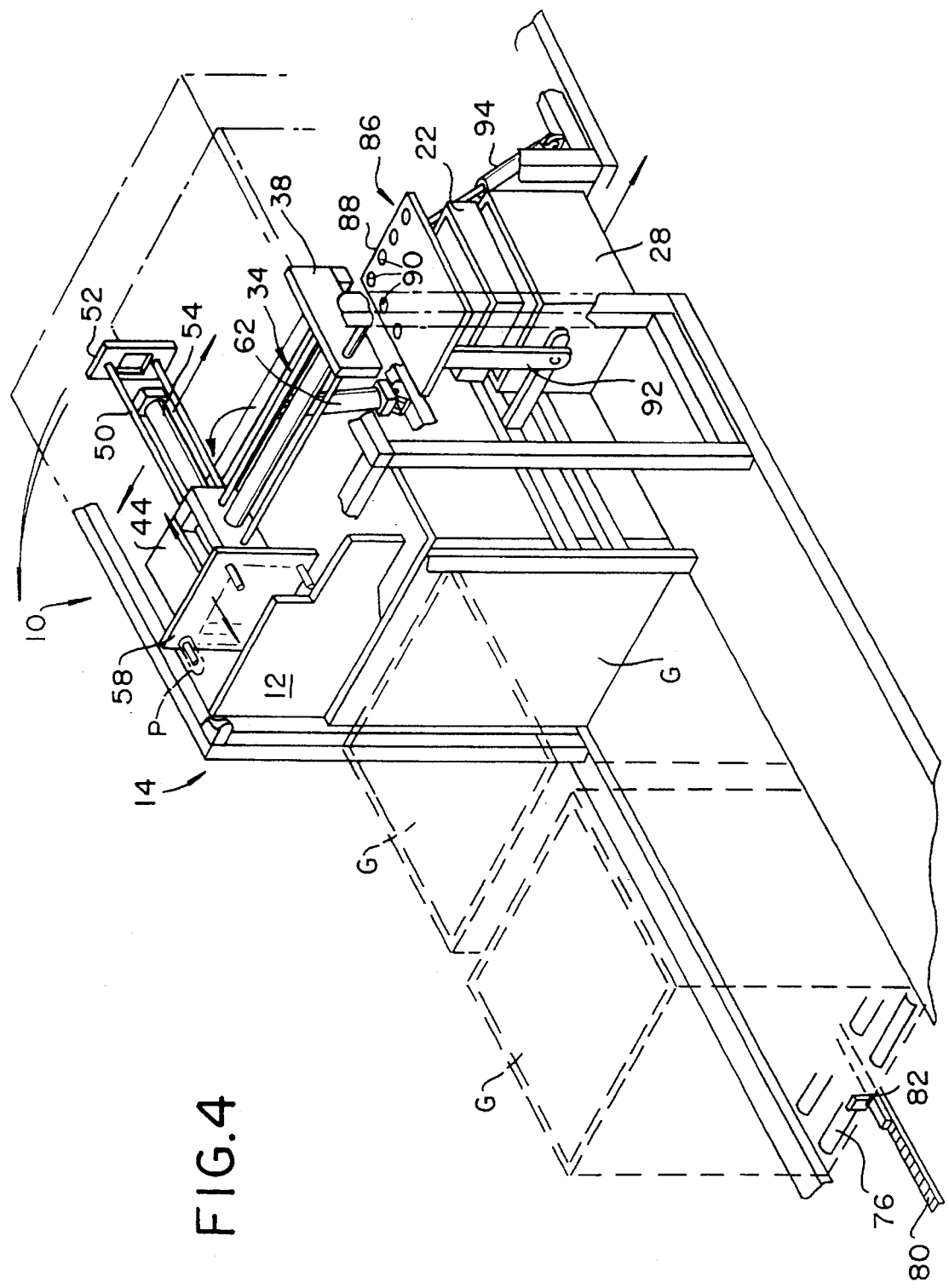
FIG. 4 is a perspective view with parts broken away showing further the details of the apparatus.
Figure 8:
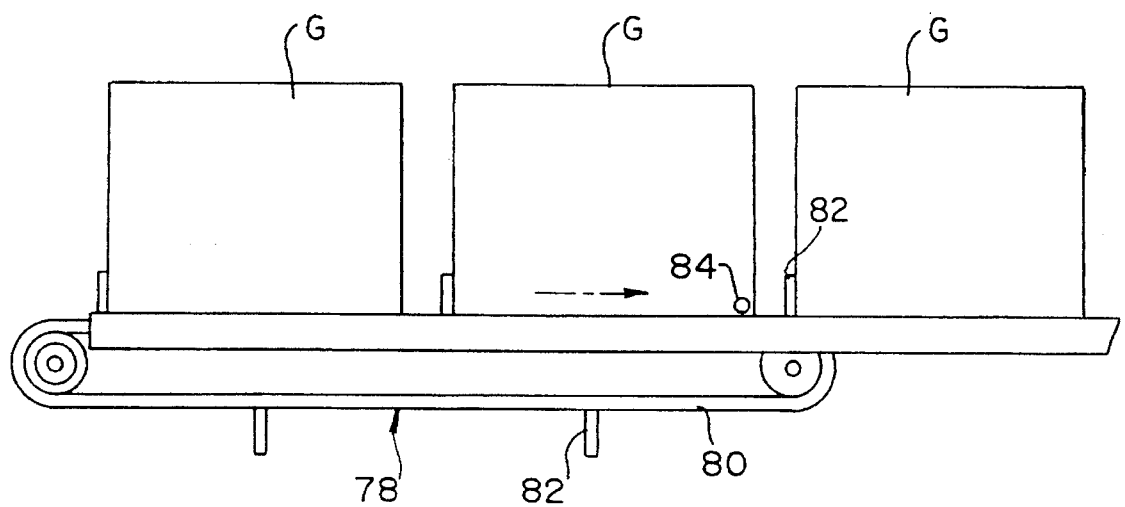
FIG. 8 is a schematic side elevational view showing the mounting of three gaylords on a conveyor for longitudinal movement through the apparatus as the gaylords are filled with coated preforms.

Reference is now made to FIGS. 4 and 8 wherein it will be seen that arrangements are made for positioning a plurality of gaylords. The gaylords G are mounted on rollers 76 (FIG. 4) for longitudinal movement through the framework 14. A conveyor system, generally-identified by the numeral 78 is provided for moving the gaylords G simultaneously through section 16 of apparatus 10. The conveyor system 78 may-simply be in the form of driven rollers, or may include an endless conveyor chain 80 having at regularly spaced intervals pusher plates 82.

With reference to FIG. 8, there is a central gaylord G which may be positioned at the preform-loading position (as shown in FIG. 1) for receiving newly coated preforms P. To the left or upstream of the central gaylord G is an empty gaylord ready to be moved forward to the preform-loading position. In FIG. 8 there is also illustrated a filled gaylord downstream (or to the right of the central gaylord) ready to be taken away. When the central gaylord is filled with preforms, the conveyor system 78 will be automatically actuated to advance the gaylords one gaylord so that the filled central gaylord will be advanced to the right and the left empty gaylord will be also moved to the right to the central position. At this time, a workman will remove the filled gaylord at the right of FIG. 8 and supply an empty gaylord at the left; alternatively, the gaylords may be provided automatically by a robot or mechanical transfer system. There is also provided a detector and control device 84 for detecting the positioning of an empty gaylord in the central location. Unless the gaylord detector 84 is actuated, the transfer and coating apparatus 10 will not function.

PREFORM SAMPLING APPARATUS

There are times when it is desired to sample the preforms P which have been newly injection molded. To this end, there is provided a preform sampling apparatus generally identified by the numeral 86 and best illustrated in FIGS. 1, 3, 4, and 6. The sampling apparatus 86 includes a sampling plate 88 which carries a number of preform-receiving openings 90 corresponding to the number of the preform-receiving pins 60. The plate 88 is pivotally mounted on the framework 14 by way of a pair of arms 92 positioned on opposite sides of the coating apparatus 20. As is best shown in FIG. 3, the plate 88 is normally positioned in an out-of-the-way position at one side of the coating tank 22. The plate 88 is automatically moved to a preform sample-taking position overlying the tank 22 as is best shown in dotted lines in FIG. 3. This movement is effected by an extensible fluid cylinder 94 which has one end pivotally connected to the framework 14 and a piston rod 96 which is pivotally connected to one of the arms 92.

When it is desired to take the preforms P carried by the plate 58 as samples, a control device actuates the fluid cylinder 94 to swing the sampling plate 88 to its dotted line position of FIG. 3 so as to be vertically aligned with the cover of the tank 22. When the carrier plate 58 reaches its position overlying the tank 22, no downward movement will be effected but the gripper fingers 122 will be disengaged from the preforms P and the preforms will slide off of the pins 60 and into the openings 90, where the preforms remain while the plate 88 is returned to its out-of-the-way position and the operation of the transfer and coating apparatus continues in the normal manner.

The sample preforms are now readily removable and can be inspected while the transfer and coating apparatus continues to operate.

ALTERNATIVE GAYLORD PACKAGING APPARATUS

Figure 12:
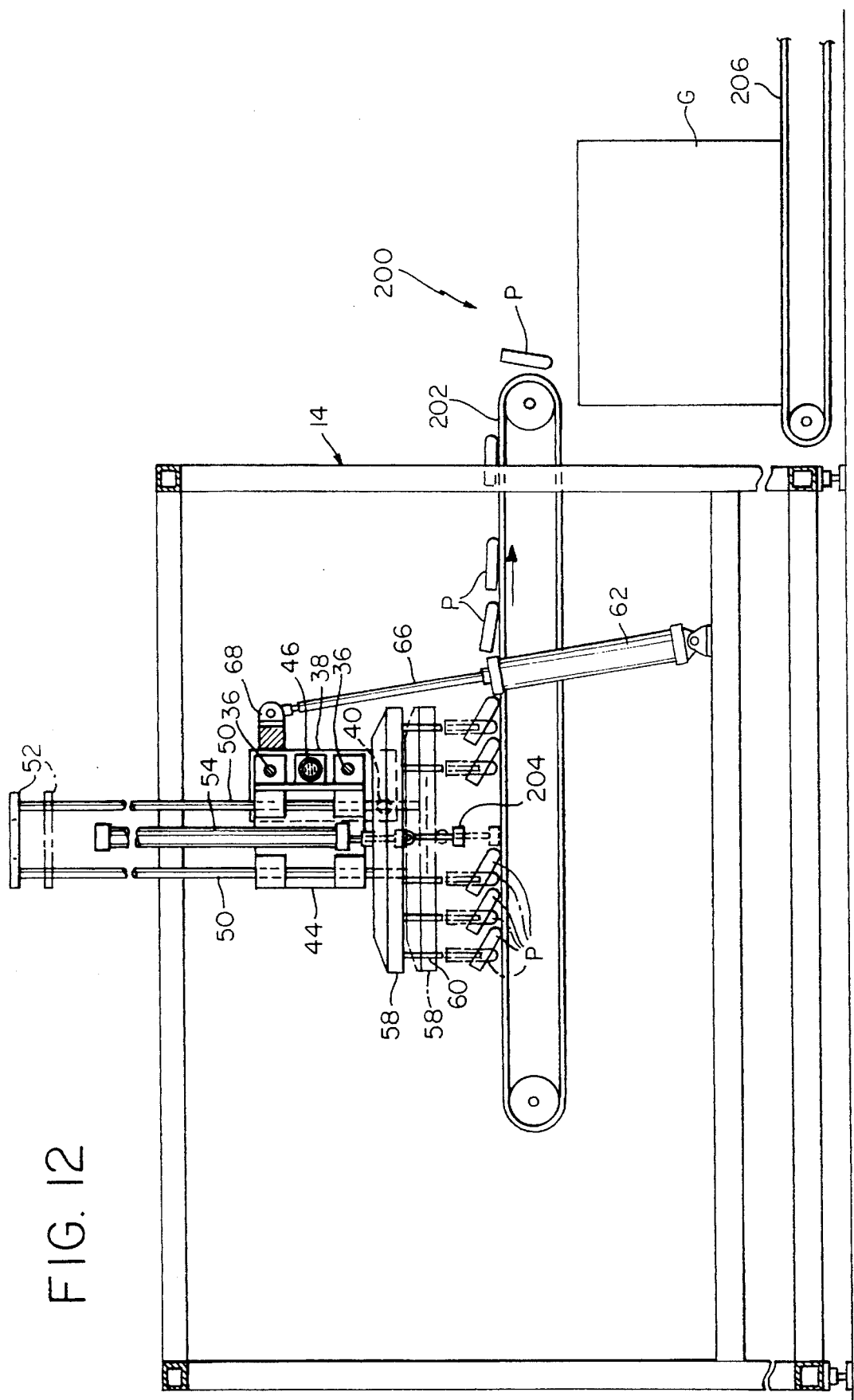
FIG. 12 is a cross-sectional view of an alternative embodiment as seen along line 12—12 of FIG. 3, but incorporating an alternative conveyor and packaging system.

In an alternative embodiment, shown in FIG. 12, the coated preforms are placed on a conveyor which then transfers them to a gaylord, rather than being directly placed in a gaylord. Thus, the transfer and coating apparatus 10 shown in FIGS. 1–11 remains the same, except that in place of the conveyor system 78 carrying gaylords G longitudinally through part 16 of the apparatus 10, an alternative conveyor system 200 is provided with a first conveyor 202 moving longitudinally through part 16.

The first conveyor 202 may be an endless belt as shown, .or in the form of an endless chain or driven rollers. After the coated preforms are removed from coating tank 22 and transported by carrier plate 58 back to the horizontal dotted line position of FIG. 2, plate 58 is automatically lowered by cylinder 54 until a sensor and control device 204 (similar to device 74) indicates that the preforms are adjacent first conveyor 202, and then the gripping fingers 122 automatically release the preforms onto the first conveyor 202. The sensor 204 is shown in phantom in a lowermost position touching or in close proximity to the conveyor. Plate 58 is then moved upwardly back to the horizontal dotted line position of FIG. 2, and then automatically returned by cylinder 62 back to the vertical starting position where plate 58 is ready to receive the next set of freshly injected preforms to be coated. The gripping fingers 122 on plate 58 may release all of the preforms onto the conveyor 202 simultaneously, or the fingers may be serially opened to release the preforms in series onto the conveyor. The first conveyor 202 then transports the preforms to a standard gaylord packaging system, which may include a second conveyor 206 carrying gaylords G which receive the preforms from first conveyor 202. Alternatively, the gaylord packaging system may include buckets for separating the preforms into groups and transporting them into the gaylords.

The first conveyor 202 is the same width as the previous gaylord conveyor so that it fits between the frame members 114, similar to the gaylord shown in FIG. 3. First conveyor 202 preferably has a shock-absorbing surface to cushion the preforms as they are deposited thereon. The conveyor 202 may have sidewalls if necessary to prevent the preforms from falling off the conveyor.

Although certain preferred embodiments of the preform transfer and coating apparatus, sample-taking, and gaylord packaging systems have been specifically illustrated and described herein, it is to be understood that variations may be made therein without departing from the spirit and scope of the invention as defined by the appended claims. For example, the preforms may be extruded rather than injection molded. The various control sensors can be mounted on any of the framework, the collection device, the transfer apparatus and the coating apparatus, so long as they detect the movement or position of the associated member. The coating tank could be a gas-filled or spray chamber, and the preforms may be inserted by moving the tank. Thus, these and other variations may be made without departing from the spirit of the invention.

What is claimed is:

1. An apparatus for cooling, coating and collecting a batch of preforms comprising:

a carrier plate for holding a batch of soft thermoplastic preforms without the preforms touching one another;

a support structure for moving the carrier plate between a coating tank for coating the preforms and a collection apparatus for receiving coated preforms, the collection apparatus being disposed on a longitudinal axis lying in a horizontal plane;

the support structure including a transverse slide for moving the carrier plate along an axis transverse with respect to the longitudinal axis from a preform-loading position over the collection apparatus to a preform-coating position over the coating tank, the transverse axis lying in the horizontal plane, the carrier plate being pivotally mounted on the transverse slide so as to be movable from a substantially vertical position wherein the carrier plate, in the preform loading position, receives a batch of uncoated preforms from a molding apparatus, to a substantially horizontal position for insertion of the preforms into the coating tank and later release of the coated preforms into the collection apparatus, the support structure further including a second slide for moving the carrier plate along a third axis substantially perpendicular to the horizontal plane, wherein the carrier plate is lowered over the coating tank for coating the preforms and lowered over the collection apparatus for release of the coated preforms onto the collection apparatus from a reduced preform drop height; and releasable grippers for supporting a batch of soft thermoplastic preforms without deformation on the carrier plate, the grippers having a closed position for retaining the preforms when the carrier plate is either vertically or horizontally disposed, and an open position for receiving uncoated preforms and releasing the coated preforms after coating.

2. The apparatus of claim 1, wherein the collection apparatus includes a longitudinally-arranged conveyor carrying at least one container past the preform-loading position for release of coated preforms from the carrier plate into the container.

3. The apparatus of claim 2, further including a first controller associated with the carrier plate for determining a space available level within the container for reducing the preform drop height.

4. The apparatus of claim 2, further including a second controller associated with the collection apparatus for positioning an empty container in the preform-loading position beneath the carrier plate.

5. The apparatus of claim 4, wherein the second controller sequentially advances the conveyor one container space to automatically advance a filled container away from the preform-loading position while advancing an empty container to the preform-loading position.

6. The apparatus of claim 1, wherein the collection apparatus includes a longitudinally-arranged conveyor for receiving coated preforms from the carrier plate.

7. The apparatus of claim 6, wherein the conveyor transports the coated preforms to a container packaging system.

8. The apparatus of claim 1, further including a first controller associated with the carrier plate for determining the position of the collection apparatus for reducing the preform drop height.

9. The apparatus of claim 1, further including a sampling plate movably mounted on the support structure for selectively receiving preforms from the carrier plate prior to the preforms being inserted into the coating tank.

10. The apparatus of claim 9, wherein the sampling plate is movable to an operative position overlying the coating tank for receiving preforms from the carrier plate.

11. The apparatus of claim 1, further including a third controller associated with a molding apparatus for initiating a transfer of preforms from the molding apparatus to the carrier plate.

12. The apparatus of claim 11, wherein the third controller actuates the second slide to move the carrier plate into position to receive uncoated preforms from a molding apparatus.

13. The apparatus of claim 1, further including a fourth controller associated with the carrier plate for detecting a return of the carrier plate, after releasing coated preforms onto the collection apparatus, to a preform-receiving position for receiving another batch of uncoated preforms from a molding apparatus.

14. The apparatus of claim 1, wherein the preforms have an open top end with a neck finish and supporting flange, a closed bottom end, and an elongated substantially cylindrical body defined by a central preform axis, and wherein the grippers engage the preform supporting flange.

15. The apparatus of claim 14, wherein the carrier plate includes an array of pins, one for each preform, which pins extend from and are disposed substantially perpendicular to the plane of the carrier plate.

16. The apparatus of claim 15, wherein the pins are arranged in longitudinal and transverse rows.

17. The apparatus of claim 15, wherein the grippers include a gripper plate slidably carried by the carrier plate, gripper fingers carried by the gripper plate on opposite sides of the pin and normally offset from the pin, and means for shifting the gripper plate relative to the pin to retain the preform on the pin.

18. The apparatus of claim 17, wherein the pin extends through an elongated notch in the gripper plate.

19. The apparatus of claim 15, wherein the pin includes a head portion attached to the carrier plate and a body terminating in a free end, a sleeve telescoped over the free end, resilient means resisting movement of the sleeve further over the body toward the head portion, and a sensor for detecting movement of the sleeve on the pin.

20. The apparatus of claim 19, wherein the sensor includes a transverse bore through the pin body adjacent the head portion, and an optical sensor having a light path through the bore which is interrupted by the sleeve when a preform is improperly placed on the pin.

21. The apparatus of claim 1, wherein there is a control device including a proximity sensor associated with the carrier plate for determining a level of previously-deposited preforms in the collection apparatus.

22. The apparatus of claim 21, wherein the control device limits the number of deposits of coated preforms into the collection apparatus to prevent overloading of the collection apparatus.

23. The apparatus of claim 1, wherein the collection apparatus includes a conveyor carrying a plurality of open top containers, and a controller for sequentially advancing the conveyor one container space to automatically advance a filled container away from the preform-loading position while advancing an empty container to a preform-loading position.

24. The apparatus of claim 23, further including a warning device signalling the absence of a container able to accept additional preforms at the preform-loading position.

25. The apparatus of claim 1, further including a preform sample collector plate pivotally mounted on the support structure adjacent the coating tank, and movable to an operative position overlying the coating tank for receiving preforms from the carrier plate.

26. The apparatus of claim 25, wherein the operative position of the preform sample collector plate is below an initial transversely displaced position of the preform carrier plate overlying the coating tank.

* * * * *